E. A. MOUCHE.
INCLINED SAW.
APPLICATION FILED FEB. 20, 1917.

1,244,231.

Patented Oct. 23, 1917.

Inventor
E. A. Mouche
by
W. E. Evans
Attorney.

UNITED STATES PATENT OFFICE.

EMILE AUGUSTE MOUCHE, OF LYON, FRANCE.

INCLINED SAW.

1,244,231.	Specification of Letters Patent.	Patented Oct. 23, 1917.

Application filed February 20, 1917. Serial No. 149,919.

*To all whom it may concern:*

Be it known that I, EMILE AUGUSTE MOUCHE, a citizen of the French Republic, residing at 61 Rue de Bonnel, Lyon, France, have invented certain new and useful Improvements Relating to Inclined Saws, of which the following is a specification.

This invention relates to inclined saws which are adapted to be applied upon the spindle of any machine tool such as that of a milling cutter.

The apparatus of the invention permits of a wide range of operation by varying the inclination of the disk of the saw for producing grooves and rabbets of any dimension.

The invention is illustrated in the accompanying drawing by way of example in which—

Figure 1:
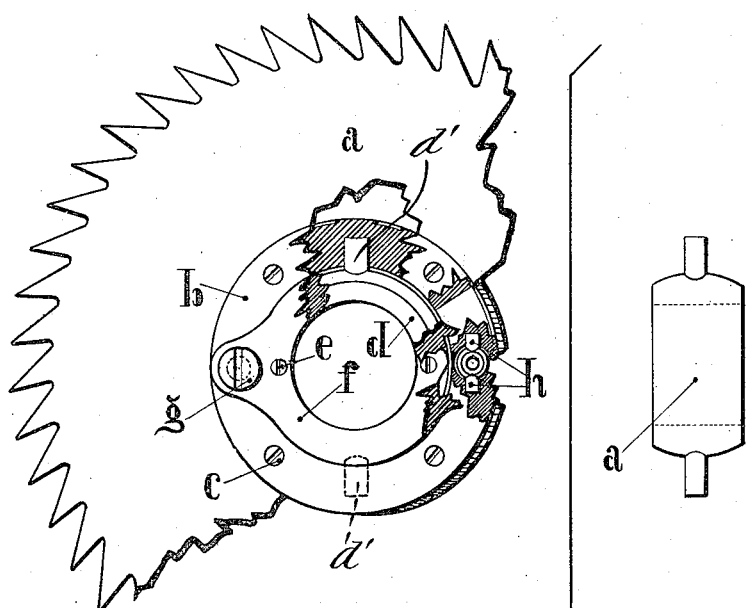
Figure 1 is a sectional view of the arrangement provided according to the invention.
Figure 3:
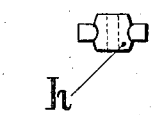
Fig. 3 shows constructional details which are identified by reference letters.
Figure 2:
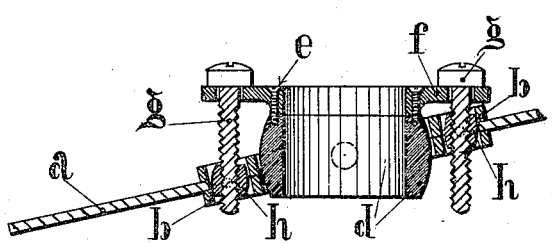
Fig. 2 is a plan view.
Figure 2:
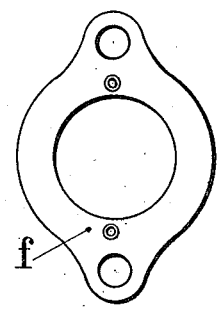

In carrying the invention into effect as illustrated in the accompanying drawing, the saw $a$ is provided with a central hole by which the saw may be fitted within a circular groove provided in the periphery of a crown $b$ which is formed in two symmetrical parts which are connected together by screws $c$. Within the crown $b$ a concentric ring $d$ is mounted carrying pivots $d^1$. The ring $d$ has a section corresponding to the diameter of the tool carrying spindle upon which the saw is to be mounted. At one side of this ring $d$, that is above the ring in the illustrated construction, an assembling disk $f$ is mounted and is connected to the ring $d$ by means of screws $e$. Upon the disk $f$ are freely mounted regulating screws $g$ which are disposed in a position perpendicular to the axes of the pivots $d^1$.

The regulating screws $g$ are screw threaded within pivoting sleeves $h$ which are pivotally mounted within recesses formed in the crown $b$. These pivoting sleeves $h$ are adapted to oscillate upon their axes simultaneously with the ring $d$ which itself turns upon an axis parallel to those of the pivoting sleeves $h$ $h$.

For regulating the inclination of the saw $a$ it suffices to operate the two regulating screws $g$ $g$ in a convenient manner in order to obtain the proper angle of operation by reference to the dimensions of the groove or rabbet to be formed.

I claim:—

A saw fitting within a groove provided in the periphery of a crown within which the saw is carried, within which crown is disposed a pivoting concentric ring carrying at one side or in the upper position a disk through which pass perpendicularly to the axes of the pivots of the ring, two regulating screws whose extremities engage within pivoting sleeves mounted within the body of the crown, these two pivoting sleeves being capable of oscillating upon their axes parallel to the axes of the pivots of the ring.

EMILE AUGUSTE MOUCHE.

Witnesses:
 PIERRE OSIRIS GUILLEON,
 HENRI DUBOEAGE.

Copies of this patent may be obtained for five cents each, by addressing the "Commissioner of Patents, Washington, D. C."